(12) United States Patent
Fukunaga et al.

(10) Patent No.: US 6,379,435 B1
(45) Date of Patent: Apr. 30, 2002

(54) ADSORBING DEVICE, METHOD OF DEODORIZING THEREWITH, AND METHOD OF SUPPLYING HIGH CONCENTRATION OXYGEN

(75) Inventors: Takeshi Fukunaga, Hyogo; Takuya Noro, Kusatsu; Takenori Hirano, Izumi, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/445,422

(22) PCT Filed: Jun. 29, 1998

(86) PCT No.: PCT/JP98/02948

§ 371 Date: Dec. 10, 1999

§ 102(e) Date: Dec. 10, 1999

(87) PCT Pub. No.: WO99/00175

PCT Pub. Date: Jan. 7, 1999

(30) Foreign Application Priority Data

| Jun. 30, 1997 | (JP) | 9/174672 |
| Aug. 29, 1997 | (JP) | 9/234239 |
| Aug. 29, 1997 | (JP) | 9/234240 |

(51) Int. Cl.[7] .......................... B01D 53/04; B01D 53/06
(52) U.S. Cl. ........................... 96/111; 96/115; 96/130; 96/143; 96/150
(58) Field of Search .............................. 95/11, 99, 105, 95/114, 115, 117, 126, 138, 143; 96/111, 130, 143, 146

(56) References Cited

U.S. PATENT DOCUMENTS

| 2,211,162 | A | * | 8/1940 | Ray et al. .................. 95/11 |
| 4,047,904 | A | * | 9/1977 | Worrall ..................... 95/11 |
| 4,056,369 | A | * | 11/1977 | Quackenbush ............ 95/11 |
| 4,094,652 | A | * | 6/1978 | Lowther .................... 96/143 |
| 4,312,640 | A | * | 1/1982 | Verrando .................. 96/130 X |
| 4,312,641 | A | * | 1/1982 | Verrando et al. .......... 95/105 |
| 4,404,005 | A | * | 9/1983 | Hamlin et al. ............ 96/111 |
| 4,421,530 | A | * | 12/1983 | Dalton, Jr. et al. ........ 95/99 |
| 4,421,531 | A | * | 12/1983 | Dalton, Jr. et al. ........ 95/99 |
| 4,472,177 | A | * | 9/1984 | Sircar ....................... 95/11 |
| 4,983,190 | A | * | 1/1991 | Verrando et al. .......... 95/11 |
| 5,389,125 | A | * | 2/1995 | Thayer et al. ............. 95/11 |
| 5,429,665 | A | * | 7/1995 | Botich ....................... 95/99 |
| 5,509,956 | A | * | 4/1996 | Opperman et al. ........ 96/143 X |
| 5,581,903 | A | * | 12/1996 | Botich ....................... 95/126 X |
| 6,022,399 | A | * | 2/2000 | Ertl et al. .................. 95/114 |

FOREIGN PATENT DOCUMENTS

| DE | 195 11 548 A1 | 6/1996 |
| JP | 54-52671 | 4/1979 |
| JP | 56-121634 | 9/1981 |
| JP | 61-189256 | 11/1986 |
| JP | 62-163725 | 7/1987 |
| JP | 63-302916 | 12/1988 |
| JP | 3-146114 | 6/1991 |
| JP | 4-200720 | 7/1992 |
| JP | 8-38885 | 2/1996 |
| JP | 8-304317 | 11/1996 |
| JP | 9-38460 | 2/1997 |

\* cited by examiner

Primary Examiner—Robert H. Spitzer
(74) Attorney, Agent, or Firm—Arent Fox Kintner Plotkin & Kahn, PLLC

(57) ABSTRACT

An adsorbing device comprising a main body having an intake port and an exhaust port and accommodating therein an adsorbing composition capable of adsorbing a gaseous specific substance; regenerating means attached to the main body for releasing the specific substance from the adsorbing composition; a sensor capable of detecting the specific substance arranged at least near the exhaust port of the main body; and a control unit for instructing the regenerating means to operate when the sensor detects the specific substance at a higher value than a predetermined value. The present invention intends to facilitate an operation to regenerate the adsorbing composition by heating and enable automation of the operation, thereby to prevent deterioration of the adsorbing composition.

14 Claims, 10 Drawing Sheets

( detached fan )

ADSORBING DEVICE, METHOD OF DEODORIZING THEREWITH, AND METHOD OF SUPPLYING HIGH CONCENTRATION OXYGEN

FIELD OF THE INVENTION

The present invention relates to an adsorbing device, a deodorizing method and a method of supplying oxygen in high concentration using the same. More particularly, it relates to an adsorbing device provided with an adsorbing composition capable of adsorbing a gaseous specific substance, means for regenerating the adsorbing composition and a sensor capable of detecting the specific substance, whereby the ability of the adsorbing composition to adsorb the specific substance is automatically restored and the adsorbing composition is prevented from deterioration, a deodorizing method and a method of supplying high-concentration oxygen with use of the adsorbing device. Such an adsorbing device can be used as an environmental purification device in chemical plants and hospitals if the specific substance is an odor, as a food-preserving device if the specific substance is oxygen and further used as a device for emergency medical care by utilizing the emission of adsorbed oxygen conversely.

BACKGROUND ART

It has been a long time since needs for preventive measures against environmental pollution were appealed with development in industry. Recently, there are increasing needs for more comfortable living environments, and advanced environmental purification techniques with excellent applicability are required. Among the environmental purification techniques, deodorizing techniques hold a particularly important position.

As deodorizing devices used in the deodorizing techniques, known are devices using adsorbents such as activated carbon, ozone and catalysts for decomposing odors (iron complex, gold and the like).

Devices using activated carbon perform deodorization by contacting gas with the activated carbon, for example, formed in a honeycomb shape, so that odor substances in the gas are physically adsorbed into micropores of the activated carbon.

Further, devices using ozone perform deodorization by decomposing odor substances with the oxidizing ability of ozone and adsorbing the rest of the odor substances that are not decomposed by ozone into manganese oxide and the like. Such devices utilizing ozone are problematic in that the structure of the devices themselves is complicated and costs increase.

Among the above, activated carbon performs deodorization by adsorbing odor substances. Therefore, the amount of adsorbates increases as use time passes and the activated carbon is finally saturated with adsorbates, losing its deodorizing effect, so that it needs to be replaced. If the activated carbon is left unreplaced, it conversely becomes a source of odor.

On the other hand, catalysts for decomposing odors perform decomposition at an extremely slow speed at room temperature. Its deodorizing effect almost depends on adsorption and deteriorates similarly to the above activated carbon.

To solve such problems, Japanese Unexamined Patent Publication HEI 7-227420 describes that the adsorbing ability of an adsorbent is recovered by irradiation with a microwave. However, in this method, the adsorbent whose adsorbing ability has declined needs to be taken out to be irradiated with microwave using a microwave oven and the like. Therefore it has a problem in that its operation is complicated.

DISCLOSURE OF THE INVENTION

Accordingly, one of major objects of the present invention is to provide an adsorbing device in which operation to regenerate the ability to adsorb a specific gaseous substance is easy and can be automated, a deodorizing method and a method of supplying high- concentration oxygen.

Another major object of the present invention is to provide an adsorbing device capable of preventing deterioration of an adsorbent, a deodorizing method and a method of supplying high- concentration oxygen.

Still another specific object of the present invention is to provide a deodorizing device capable of exhibiting a constant deodorizing effect and a deodorizing method.

Accordingly, the present invention provides an adsorbing device comprising: a main body having an intake port and an exhaust port and accommodating therein an adsorbing composition capable of adsorbing a specific gaseous substance; regenerating means attached to the main body for releasing the specific substance from the adsorbing composition; a sensor capable of detecting the specific substance arranged at least near the exhaust port; and a control unit which instructs the regenerating means to operate when the sensor detects the substance specific at a higher value than a predetermined value.

That is, the present invention intends to facilitate an operation to regenerate the adsorbing composition and enable automation of the operation by installing the regenerating means for the adsorbing composition and the sensor for detecting the specific substance, and furthermore, to prevent the adsorbing composition from deterioration by regenerating the adsorbing composition by heating only when its adsorbing ability declines.

In the present invention, the gaseous specific substances include odor substances such as $H_2S$, $NH_3$ and the like, and further oxygen to be removed because it oxidizes food and oxygen to be supplied because of necessity for emergency medical care and respiratory assistance.

In the present invention, the adsorbing composition signifies a composition comprised of an adsorbent, an excipient normally added to the adsorbent, a microwave absorbing inorganic substance optionally added to the adsorbent and the like.

As an adsorbing composition capable of adsorbing an odor substance, pointed out is an adsorbing composition containing as a main ingredient any one of zeolite, a metal oxide and a carbon substance.

As adsorbing compositions capable of adsorbing oxygen, mentioned are a composition of zeolite and a microwave absorbing inorganic substance and a composition of activated carbon allowed to carry a copper halide. Adsorbing compositions of such combinations can easily release oxygen once adsorbed or allow facile regeneration of the deodorizing composition.

In the present invention, as the regenerating means for releasing the specific substance from these adsorbing compositions, mentioned are heating means for heating the adsorbing composition, irradiating means for irradiating the adsorbing composition with light and the like.

Examples of the heating means include a magnetron for heating and regenerating the adsorbing composition by irradiating with a microwave, an infrared heater or lamp for heating and regenerating the adsorbing composition by emitting infrared rays (including far infrared rays and near infrared rays), an electric heater for regenerating the adsorbing composition by normal resistance heating and the like.

In the present invention, a sensor capable of detecting the specific substance is arranged at least in proximity of the exhaust port of the main body. Here, the proximity of the exhaust port signifies an area inside or outside of the main body, at which the specific substance in a gas discharged from the exhaust port can be detected.

As the sensor, used are a sensor capable of detecting a gaseous odor substance and a sensor capable of detecting oxygen. The sensor itself is selected from known sensors.

In the present invention, provided is a control unit such as an electrical circuit or a microcomputer which instructs the regenerating means to operate if the sensor detects the specific substance at a value higher than a predetermined value.

In another aspect, the present invention provides a deodorizing method comprised of allowing an odor to be adsorbed by the adsorbing composition and then heating the adsorbing composition to decompose an odor component adsorbed by the adsorbing composition if the sensor detects the odor in a gas at a value higher than a predetermined value.

Further, the present invention provides a method of supplying high-concentration oxygen comprised of irradiating with a microwave an adsorbing composition containing zeolite and a microwave absorbent inorganic substance which has adsorbed oxygen to heat the adsorbing composition, thereby to release oxygen, and a high-concentration oxygen supplying device therefor.

Figure 1:
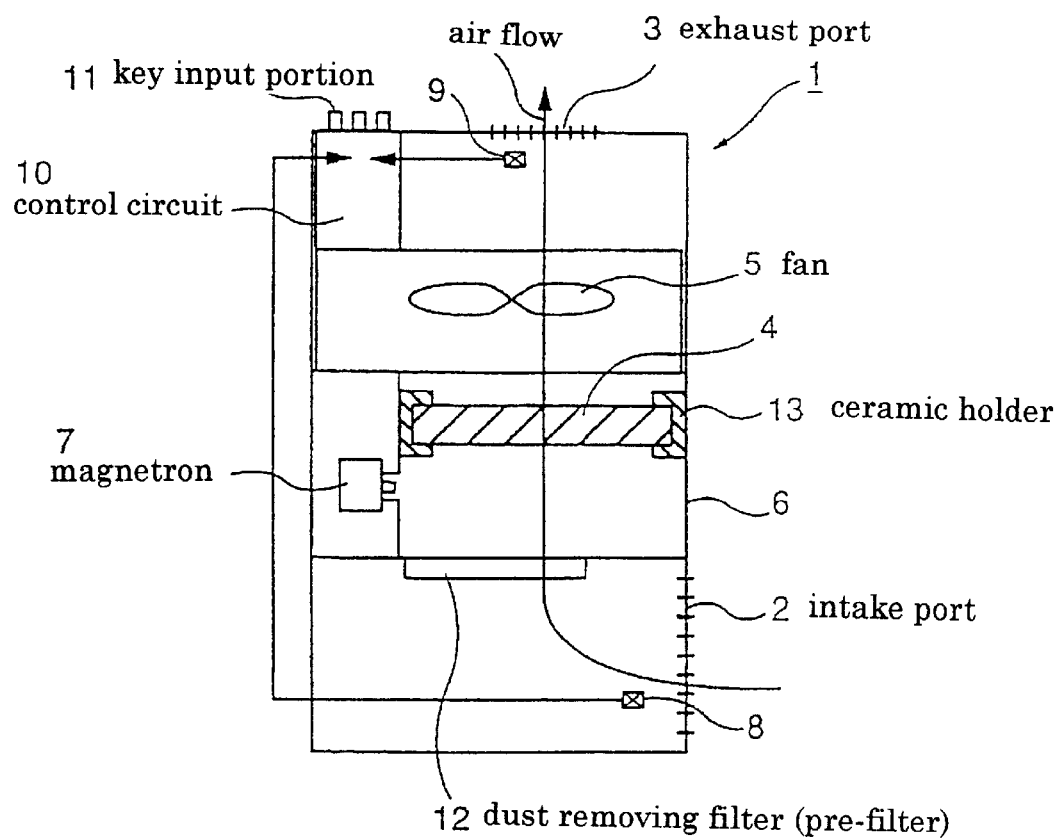
FIG. 1 is a view illustrating a construction of an embodiment of a deodorizing device according to the present invention.

BEST MODE FOR CARRYING OUT THE INVENTION (1) In the Case Where the Gaseous Specific Substance is an Odor Substance The adsorbing device according to the present invention can be used as a deodorizer by employing an adsorbing composition capable of adsorbing an odor substance.

The adsorbing composition capable of adsorbing the odor substance is not limited to a composition having a microwave absorbency but any composition known in the art can suitably be used. In particular, a composition having the microwave absorbency is more preferable. Specifically, it can be pointed out zeolite, a metal oxide, a carbon substance and the like which have a relatively high adsorptivity to odor substances. In the present invention, it is preferable to use an adsorbing composition (or an adsorbent) containing any one of zeolite, the metal oxide or the carbon substance.

Examples of zeolite include ZSM-5, Cu-ZSM-5, Pt-ZSM-5, β-zeolite, molecular sieves 3S, 4A and 13X, mordenite (hereinafter referred to as MOR) and the like. Particularly preferred zeolite is ZSM-5 or β-zeolite. ZSM-5 is a product referred to as "Zeolite of Socony Mobil-5" of Mobil. Composition thereof is $Na_nAl_nSi_{96-n}O_{192} \sim 16H_2O$ (wherein n<27, typically n is 3).

The metal oxides include oxides of zinc, copper, manganese, nickel, cobalt, iron, tin, titanium, silicon and the like, mixtures of these oxides, compound oxides of said metals (for example, a perovskite type) and the like. Among these, manganese oxide is preferable. Specifically, preferable is a compound oxide of at least one metal oxide selected from a manganese oxide itself such as $MnO$, $MnO_2$ or $Mn_2O_3$, a copper oxide, an iron oxide and a nickel oxide with a manganese oxide (for example, a perovskite type). Further, the copper oxide (as well as the iron oxide and the nickel oxide) may be either of copper (I) oxide and copper (II) oxide.

The carbon substances include graphite, activated carbon, carbon black and the like. The above-described zeolite, metal oxide and carbon substance may be used singly or as a combination Among the above-mentioned adsorbing compositions, a particularly preferred combination is the zeolite and the manganese oxide. Mixed ratio of the zeolite and the manganese oxide (ratio by weight) is preferably 1–5:1, more preferably 2–3:1.

The above-described adsorbing composition is particularly useful for removing odor substances having high polarity, for example, those containing a nitrogen atom or a sulfur atom such as trimethylamine or ethylmercaptan. If the adsorbing composition is irradiated with a microwave at the regeneration thereof, the adsorbing composition effectively adsorbs such high polar substances. It is considered that the above-described substances absorb the microwave and activate the adsorbed odor substances to decompose.

The adsorbing composition may be used in the form of granules, powders, pellets, tablets or honeycomb according to its application. Further, the adsorbing composition may be used as a plate with a plurality of pores (round pores, slit-like pores, etc.), or as a lattice or a shelf made by combining a plurality of narrow plates or by monolithic molding. Where the adsorbing composition formed into granules, powders, pellets or tablets is used, it is preferable to hold the adsorbing composition in a container through which a gaseous substance, i.e., air, can pass.

Where the adsorbing composition is irradiated with a microwave for heating and regenerating the composition, it is preferable to irradiate it with a microwave such that the temperature of the adsorbing composition is kept 500° C. or less. At temperatures higher than this, the adsorbing composition denatures, burns or the like, deteriorating its adsorptivity. Further, if the adsorbing composition contains a carbon substance and the like, it is preferable to irradiate it with a microwave such that the temperature is kept 350° C. or less. Particularly preferred temperature of the adsorbing composition at the irradiation is 50 to 300° C.

A microwave having, for example, a frequency of 1–10 GHz and an output of 100–1000 W can be used. Generally, a microwave of 2.45 GHz is used. It is preferable to provide a magnetron so that the whole adsorbing composition is uniformly irradiated with- the microwave.

Irradiating time of the microwave varies depending on the type of the adsorbing composition, the amount of the odor substance, the frequency and output of the microwave. In the case of successive irradiation, for example, irradiating time of 1–20 minutes is suitable.

The adsorbing device of the present invention can be applied to household exhaustion or intake such as of an air purifier and a refrigerator, or to industrial exhaustion or intake such as for a livestock industry, a food processing industry and the like.

In the present invention, for the purpose of detecting the odor substance, the sensor is, for example, a semiconductor sensor in which a pair of platinum alloy wire (Pd—Ir) coils is installed inside of a sinter of an n-type semiconductor comprised of a metal oxide (for example, $SnO_2$) which has been subjected to a sintering aging treatment. Further, the semiconductor sensor is adapted to serve as a heater by applying voltage to one of the coils and is heated additionally by a sensor current (Joule's heat) to about 350° C. for use. If the sensor contacts the odor, oxygen on the surface of the sensor reacts and is taken away, so that the oxygen ion concentration on the surface is reduced and an electron path is widened. Thereby electric current flows easily.

Hereinafter, the present invention will be explained in detail with reference to embodiments shown in the figures. Incidentally, the present invention is not limited thereto.

Figure 2:
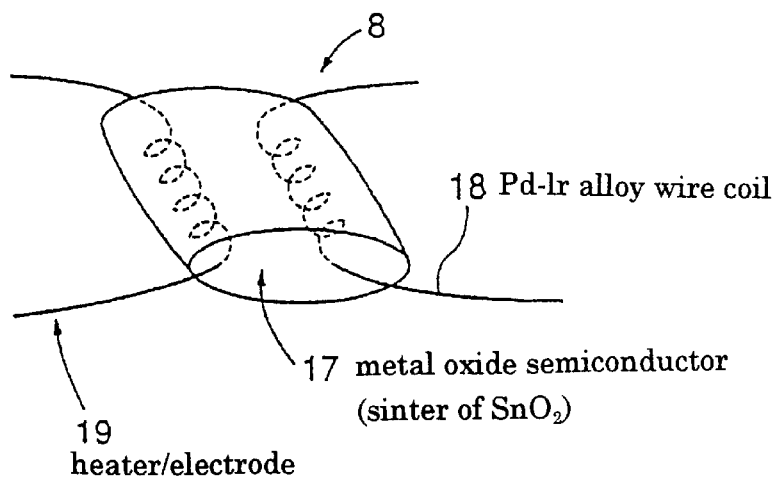
FIG. 2 is an enlarged view illustrating a construction of an odor sensor of the deodorizing device.
Figure 3:
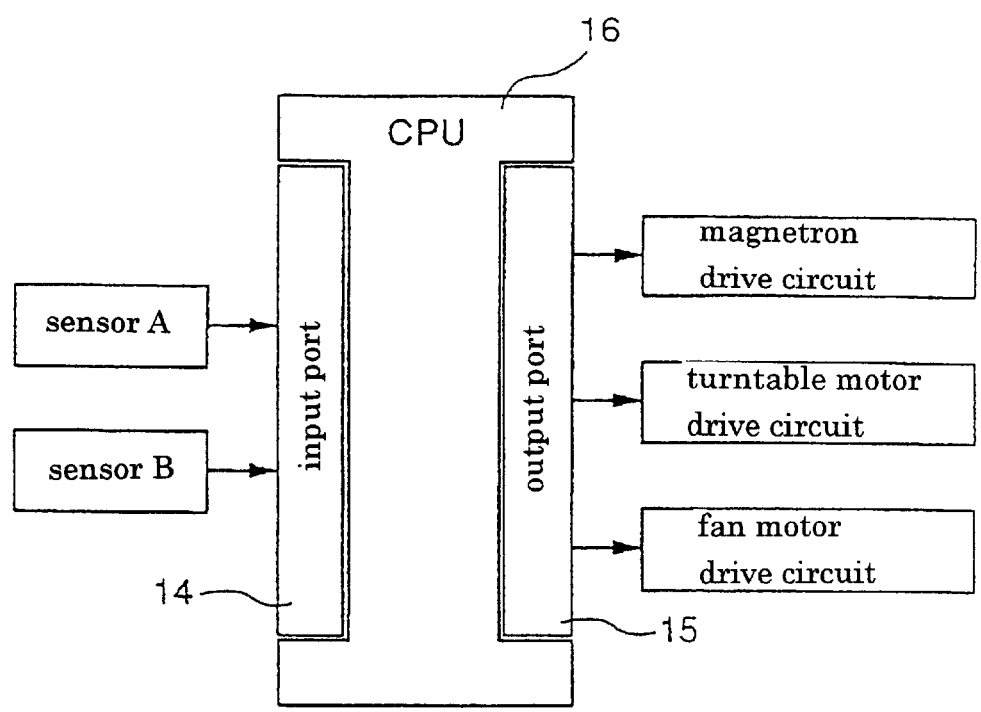
FIG. 3 is a schematic view illustrating a circuit construction of the deodorizing device.
Figure 4:
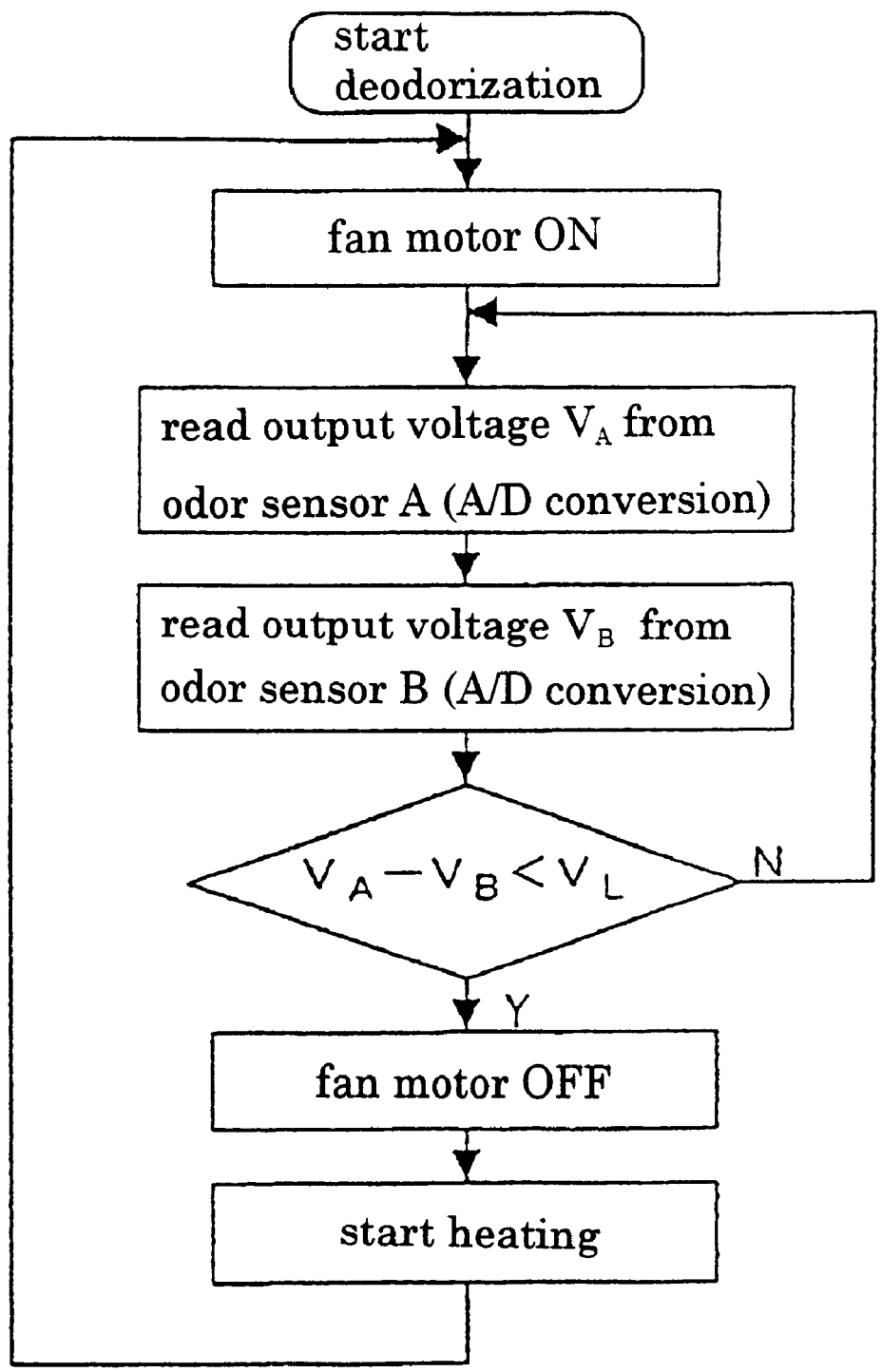
FIG. 4 is a flow chart showing a deodorizing operation of the deodorizing device.
Figure 5:
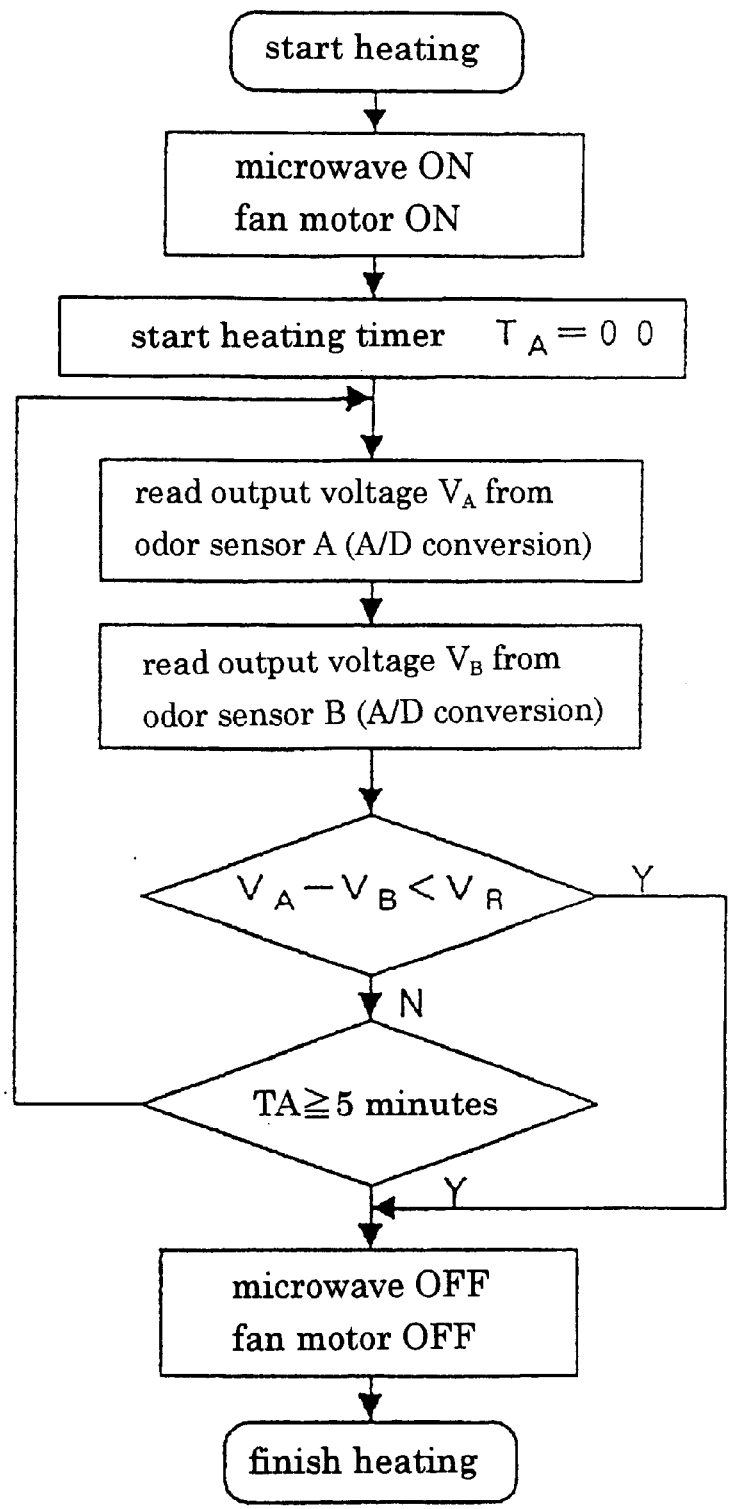
FIG. 5 is a flow chart showing a regenerating operation of the same.

FIG. 1 is a view illustrating a construction of an embodiment of a deodorizing device as an adsorbing device of the present invention, FIG. 2 is an enlarged view of an odor sensor thereof, FIG. 3 is a schematic view illustrating a circuit construction of the deodorizing device, and FIGS. 4 and 5 are flowcharts.

First, in FIG. 1, a deodorizing device 1 mainly comprises a main body 6 having an intake port 2 and an exhaust port 3 and accommodating therein an adsorbent 4 as an adsorbing composition and a fan 5, a magnetron 7 attached to the main body, an odor sensor A (8) as a first sensor arranged near the intake port 2, an odor sensor B (9) as a second sensor arranged near the exhaust port 3 and a control circuit 10 as a control unit.

Further, 11 is a key input portion, 12 is a dust removing filter and 13 is a ceramic holder.

In FIG. 3, the control circuit 10 mainly comprises a microcomputer 16 provided with an input port 14 for receiving output signals from the sensor A (8) and the sensor B (9) and an output port 15 for instructing operation of the magnetron 7, the fan (a motor) 5 and a turn table (a motor) which is not shown in the figure.

Here, in FIG. 2, the basic construction of the sensor A (8) is a semiconductor sensor in which a pair of platinum alloy wire (PA-Ir) coils 18 and 19 is installed inside of a sinter 17 made of an n-type type semiconductor comprised of a metal oxide ($SnO_2$) which has been subjected to a long-term sintering aging treatment process. One of the coils 19 is adapted to serve also as a heater by applying voltage and the sensor is heated to about 350° C. by a sensor current (Joule's heat) for use.

Next, the operation of the deodorizing device provided with the above-mentioned construction is explained with reference to FIGS. 1 to 5, particularly FIGS. 1 and 5.

When the fan 5 in the deodorizing device 1 is actuated, a gas (for example, an indoor air) is inhaled from the intake port 2 and emitted from the exhaust port 3 through the adsorbent (a deodorizing catalyst) 4. Odor substances in the gas (such as $H_2S$, $NH_3$ and the like) are adsorbed by the adsorbent 4. This deodorizing operation is continued and the adsorptivity of the adsorbent 4 is lowered. If the difference between an output voltage ($V_A$) of the odor sensor A (8) and that ($V_B$) of the odor sensor B (9) is smaller than a predetermined value ($V_L$, a threshold value), the fan is stopped and the deodorizing operation is finished (see FIG. 4).

Then, particularly in FIGS. 1 and 5, when the magnetron 7 and the fan 5 are actuated, the adsorbent 4 is regenerated through irradiation with a microwave by the magnetron 7. Then if the difference between the output voltages of the odor sensors A (8) and B (9) exceeds a predetermined voltage ($V_R$, a threshold value for determining whether the deodorizing catalyst of the adsorbent has been regenerated by heating), the magnetron 7 and the fan 5 are stopped and the regenerating operation of the adsorbent is finished.

Differently from the above embodiment, it is also possible to form the adsorbent into granules so that it can be stirred.

Figure 6:
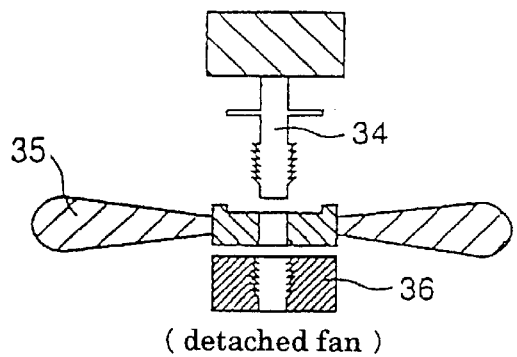
FIG. 6 is a view corresponding to FIG. 1, illustrating another embodiment.
Figure 6:
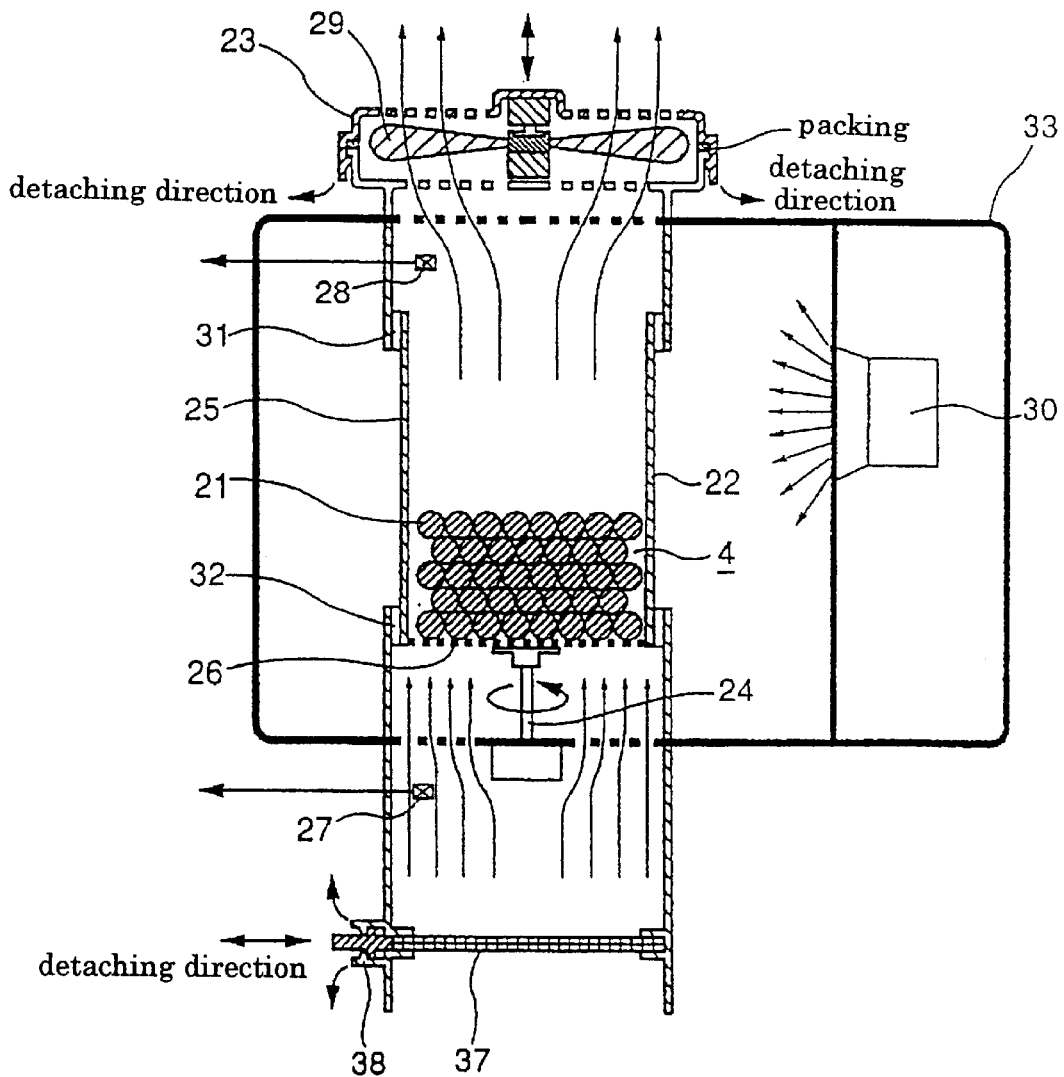

FIG. 6 is a view corresponding to FIG. 1, illustrating another embodiment.

In FIG. 6, the adsorbent 4 is in the form of granules 21 (for example, pellets of 6 mm diameter and 6 mm length) and the device comprises a container 22 for holding the adsorbent 4 and a drive motor shaft 24 for rotating the container. The container 22 consists of a heat-resistant transparent glass column 25 and a disc 26 having a plurality of pores. Incidentally, 27 is a sensor A, 28 is a sensor B, 31 and 32 are sliding members for sealing and 23 is a fan case.

If the difference between the output voltages from the sensors A 27 and B 28 is smaller than the predetermined value $V_L$, a fan 29 is stopped in a similar manner to the embodiment shown in FIGS. 1 to 5 and the deodorizing operation is finished. Then, when a magnetron 30 and the fan 29 are actuated, the granular adsorbent 4 is stirred by rotation while being irradiated with a microwave by the magnetron 30 to be homogeneously regenerated by heating.

Incidentally, the fan case 23 can be detached from a main body 33 by releasing engagement thereof caused by elasticity of a synthetic resin material. The fan 29 comprises a drive motor shaft 34, a blade portion 35 and a bearing 36, and these portions can also be taken apart by releasing screw engagement thereof, so that dirt can be easily washed off. Further, 37 is a pre-filter, which can be detached by releasing elastic engagement of an engage portion 38, whereby the condition of the adsorbent in the inside can be inspected.

Since other constructions and operations of FIG. 6 are the same as those shown in FIGS. 1 to 5, explanation thereof will be omitted.

Still differently from the above embodiments, the granular adsorbent can be stirred by a stirring screw.

Figure 7:
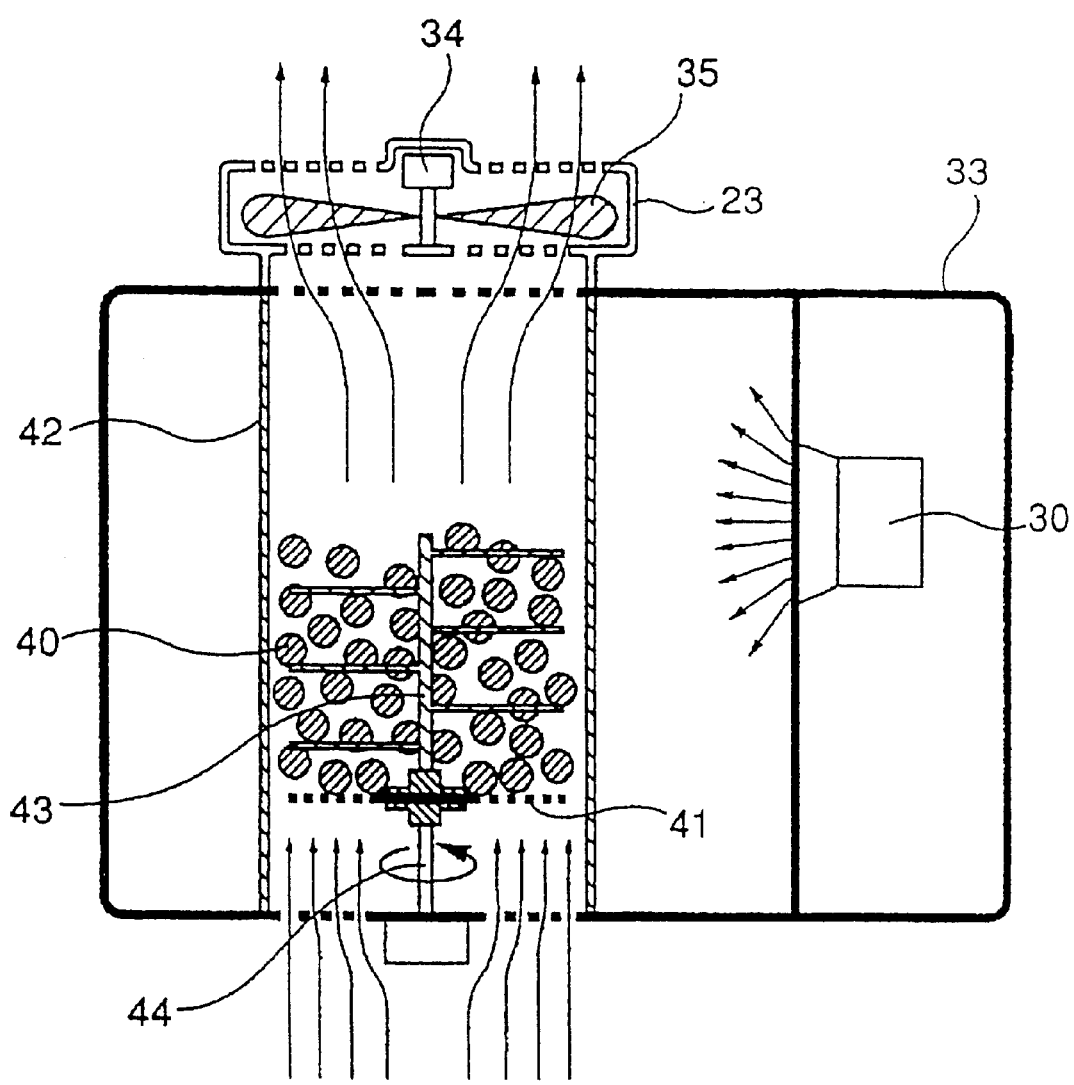
FIG. 7 is a view corresponding to FIG. 1, illustrating still another embodiment.

FIG. 7 is a view corresponding to FIG. 1, illustrating another embodiment.

In FIG. 7, the adsorbent 40 is in the form of granules and the device comprises a container 42 for accommodating the adsorbent, in which a metallic stirring screw 43 and a rotation drive motor shaft 44 therefor are supported rotatably by a porous plate 41 at the bottom. The granular adsorbent 40 is stirred by rotation of the stirring screw 43 while being regenerated by heating through irradiation with a microwave, so that uneven heating is prevented and the adsorbent is homogeneously heated and regenerated. Specifically, the stirring screw 43 is made of metal and therefore can reflect the microwave, whereby the adsorbent can be effectively heated.

As described above, according to the deodorizing device of the present invention, the odor sensor is arranged at least near the exhaust port so that the magnetron is instructed to operate when the adsorbing ability (or a deodorizing ability) of the adsorbing composition is detected as being deteriorated. Thereby, the adsorbing composition is regenerated by heating only when the adsorptivity is substantially lowered, and the deterioration of the adsorbing composition is prevented. Further, the odor substance adsorbed by the adsorbing composition is decomposed into different substances having no odor through the regeneration by heating, whereby the odor is not released again.

(2) In the Case Where the Specific Gaseous Substance is Oxygen

The adsorbing device according to the present invention can be used as a deoxidizing device and an oxygen supplying device by using an adsorbing composition capable of adsorbing oxygen.

Examples of the adsorbing composition (or an oxygen adsorbent) capable of adsorbing oxygen include activated carbon allowed to carry a copper halide and a composition containing zeolite and a microwave absorbent inorganic substance. If the former is used as the adsorbing composition of the present invention, the adsorbing device can be used as a deoxidizing device and if the latter is used, the device can be used as an oxygen supplying device.

(2)-i) A Deoxidizing Device

First, a deoxidizindg device is explained.

Activated carbon adapted to carry a copper halide exhibits a high adsorptivity of oxygen and a high selectivity to oxygen/nitrogen adsorption and can restore the oxygen adsorptivity by being heated to release the adsorbed oxygen as carbon dioxide.

As "halogen" for the copper halide, mentioned are fluorine, chlorine, bromine and iodine, but fluorine and chlorine are preferable in terms of the oxygen adsorptivity. Further, "copper" for the copper halide may be either monovalent or bivalent, but bivalent copper is preferable in terms of the oxygen adsorptivity.

Accordingly, examples of the copper halide include copper (II) fluoride, copper (I) fluoride, copper (II) chloride, copper (I) chloride, copper (II) bromide, copper (I) bromide, copper (II) iodide and copper (I) iodide, among which copper (II) fluoride and copper (II) chloride are preferable in terms of the oxygen adsorptivity.

The activated carbon may be activated carbon such as of coconut shells and may be in any form of pellets, an indefinite form (crushed carbon), honeycomb and the like. For example, in the pellet form, the size thereof may be $\phi$1–10 mm×1–5 mm, preferably $\phi$2–4 mm×1–2 mm.

The adsorbing composition used herein is obtained by allowing the activated carbon to carry a copper halide. The method of allowing the activated carbon to carry a copper halide may be a known method such as an impregnation method, a soaking method, a spraying method or the like. In the impregnation method, the activated carbon is immersed in a 1–50% aqueous solution of the above-described copper halide at 0–60° C. under normal pressure for 5–25 hours and then dried at 50–100° C. for 2–15 hours, thereby to obtain the adsorbing composition. Further, if the copper halide is hardly soluble to water, it may be possible to add a small amount of hydrochloric acid to dissolve the copper halide.

The content of the copper halide in the adsorbing composition may be 10–50 wt % in terms of copper, preferably 20–40 wt % in terms of copper. If the content of the copper halide is within this range, a favorable oxygen adsorptivity is obtained. However, if it exceeds the range, it is not preferable because the copper halide covers an effective surface of the activated carbon and relatively reduces an effective area for contacting outside atmosphere, thereby to decrease the oxygen adsorptivity.

Thus formed adsorbing composition can be provided with an enhanced oxygen adsorptivity and selectivity to oxygen/nitrogen adsorption if it is heat-treated before put into use.

The method of regenerating by heating may be irradiation of a microwave, heating by a heater and the like, but the irradiation of a microwave is preferable because it enables an instant heating.

Temperature and time for the heating process is generally 200–300° C. and for 1–30 minutes. Further, an atmosphere at the heating is not specifically limited, but a lower concentration of oxygen is more preferable and a vacuum or an inert gas atmosphere (such as nitrogen gas) is more preferable.

Next, the regeneration of the adsorbing composition after adsorbing oxygen can be conducted in the very same manner as the above-described heating process. The regeneration of the adsorbing composition can be confirmed by the amount of carbon dioxide generated through heating. That is, the adsorbing composition having adsorbed oxygen is heated in the above manner, and when carbon dioxide is obtained in an amount equal to or larger than the amount of the adsorbed oxygen, the regeneration of the adsorbing composition is recognized as completed.

This adsorbing composition exhibits an enhanced oxygen adsorptivity and selectivity to oxygen adsorption as compared with the case where activated carbon is used singly, and can restore its oxygen adsorptivity by being heated. Therefore, a device utilizing this adsorbing composition can be used as a deoxidizing device for preventing oxidization of foods and the like. More precisely, it can prevent deterioration of food due to oxidization in a household refrigerator (especially a crisper), a vegetable storage for industrial use, a showcase for food and the like. Further, when the adsorbing composition is used in a closet, coloration (yellowing) of clothes caused by oxidization of substances stuck to the clothes is prevented and a protection effect against insects is obtained by an anaerobic atmosphere.

The oxygen adsorptivity of the adsorbing composition varies depending on the type of the activated carbon and of the copper halide to be used and a use ratio thereof. For example, about 1.8 g of the adsorbing composition of the present invention can reduce the oxygen concentration in a container of 100 liter volume from 21% to 3%.

(2)-ii) An Oxygen Supplying Device

Next, explanation will be given to the case where a composition containing zeolite and a microwave absorbent inorganic substance is used as the adsorbing composition capable of adsorbing oxygen. If this adsorbing composition is used for the adsorbing device described in (1), the device can be used as a high-concentration oxygen supplying device.

As zeolite which is an adsorbent used suitably as the adsorbing composition, may be mentioned ferrierite (hereinafter referred to as FER) and faujasite (hereinafter referred to as NaY), in addition to the zeolites as described in (1). Among them, FER which adsorbs a larger amount of oxygen is particularly preferable.

Zeolite can be used singly, but zeolite carrying a metallic ion has a higher adsorption ratio of oxygen gas with respect to that of nitrogen gas as compared with the case where zeolite is used singly, therefore it is preferable.

Examples of metals carried by zeolite preferably include copper, lanthanum, chromium and silver, among which silver is more preferable. Therefore, as the zeolite carrying a metallic ion used in the present invention, preferable are ferrierite carrying a copper ion (Cu-FER), ferrierite carrying a lanthanum ion (La-FER), ferrierite carrying a chromium ion (Cr-FER), ferrierite carrying a silver ion (Ag-FER), mordenite carrying a silver ion (Ag-MOR), faujasite carrying a silver ion (Ag—NaY), ZSM-5 carrying a silver ion (Ag-ZSM-5) and the like, among which Ag-FER is particularly preferable.

The zeolite carrying a metallic ion can be produced by immersing zeolite in a solution of a metallic salt of a desired metal such as a nitrate, acetate or ammine complex salt for ion exchange, followed by sintering the zeolite at 400 to 600° C.

As the microwave absorbent inorganic substance, mentioned is silicon carbide in addition to the metal oxides and compound oxides described in (1). The compound oxides may be, for example, compound oxides of CuO:MnO=2:1 to 1:10 or $Fe_2O_3$:MnO=5:1 to 1:5, among which a compound oxide of CuO:MnO=22:50 (N140; produced by NISSAN GIRDLER CATALYST CO., LTD.) is particularly preferable.

Composition ratio of zeolite to the microwave absorbent inorganic substance is preferably 1:1 to 10:1 by weight, more preferably 1:1 to 5:1. If the ratio of zeolite is smaller than 1:1, it is not preferable because the amount of oxygen to be emitted is reduced. Further, if the ratio of zeolite is larger than 10:1, it is not preferable because a sufficient heating is not obtained through irradiation of a microwave.

The adsorbing composition can be formed by mixing zeolite itself or zeolite carrying a metallic ion with the microwave absorbent inorganic substance and forming into shapes as described in (1) according to its purpose. For example, in the case of a granular shape, the diameter of about 2 to 10 nm is suitable.

The mechanism of oxygen emission lies in that the microwave absorbent inorganic substance in the composition generates heat through irradiation of a microwave, zeolite is heated with the heat and adsorbed oxygen is emitted as it is. Here, the method of irradiating a microwave is not particularly limited, but the microwave may be irradiated intermittently during the oxygen emission or after zeolite is saturated with oxygen. In the case of irradiation during the oxygen emission, for example, a microwave having a frequency of 1–10 GHz and 50–1500 W may be applied at 0.1–10 second intervals. In the case of irradiation after saturation with oxygen, a microwave having a frequency of 1–10 GHz and 50–1500 W may be applied for 5–10 minutes.

Such a high-concentration oxygen supplying device can be miniaturized as compared with a conventional oxygen supplying device utilizing a TSA or PSA method, and is capable of supplying high-concentration oxygen instantly and conveniently if needed.

In addition, oxygen is quickly re-adsorbed after desorption of oxygen and an adsorption-desorption cycle is short. Therefore high-concentration oxygen can be repeatedly supplied in a short period.

Accordingly, it is suitable for use for emergency medical care, respiratory assistance and the like which require high-concentration oxygen in an instant. Further, it is expected to be applicable to a field of oxygen supply in the case of oxygen shortage in indoors caused by use of a kerosene heater, a gas heater and the like.

The present invention will be explained in detail with the following examples, but the present invention is not limited thereto.

EXAMPLE 1

Production of Oxygen Adsorbent as Oxygen Adsorbing Composition

Copper (II) chloride ($CuCl_2.2H_2O$), 6.7 g, was dissolved in water to obtain 100 ml of an aqueous solution of copper (II) chloride. In this aqueous solution, 10 g of activated carbon (produced by Kuraray Chemicals, crushed activated carbon of coconut shells with a surface area of about 1000 $m^2/g$, hereinafter referred to as GG) was immersed at room temperature overnight so that the activated carbon carried copper (II) chloride. Then, moisture in the activated carbon was evaporated through an evaporator and further dried at 80° C. for 5 hours to obtain an oxygen adsorbent containing 20 wt % of copper (II) chloride in terms of copper (20% $CuCl_2$-GG).

Further, 5% $CuCl_2$-GG, 10% $CuCl_2$-GG and 40% $CuCl_2$-GG were obtained in the same manner as described above except that the amount of copper (II) chloride was 1.4 g, 3.0 g and 17.9 g, respectively. Further, 30% $CuF_2$-GG and 30% CuCl-GG were obtained in the same manner as described above except that copper (II) chloride was replaced with 9.3 g of copper (II) fluoride ($CuF_2$) and 6.6 g of copper (I) chloride (CuCl), respectively. Incidentally, a small amount of hydrochloric acid was added for preparing aqueous solutions of copper (II) fluoride and copper (I) chloride.

Reference Example 1

Further, 20% $CuSO_4$-GG and 20% $FeCl_2$-GG were obtained in the same manner as described in Example 1 except that copper (II) chloride was replaced with 6.2 g of copper sulfate ($CuSO_4$. $5H_2O$) and 7.8 g of copper (I) chloride ($FeCl_2.4H_2O$), respectively.

EXAMPLE 2

Figure 8:
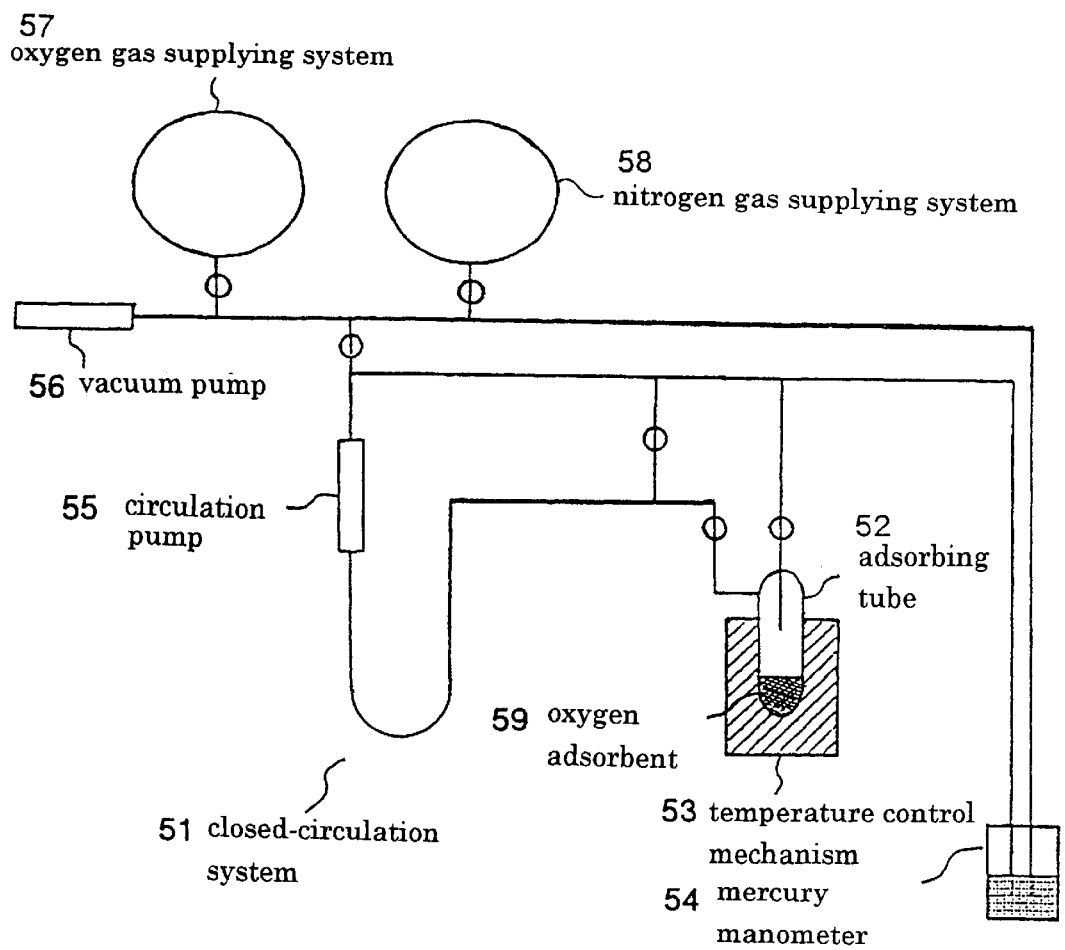
FIG. 8 is a schematic view of a closed-circulatory system used for determining the amount of oxygen absorbed by an oxygen adsorbent in Example 2.

Determination of Amount of Adsorbed Oxygen and Surface Area of the Oxygen Absorbent The amount of adsorbed oxygen (the amount of absorbed oxygen) of the oxygen adsorbents was determined using a closed-circulation system 51 shown in FIG. 8 comprised of an adsorbing tube (an absorbing tube) 52 provided with a temperature control mechanism 53 comprising an ice trap and an electric oven, a mercury manometer 54, a circulation pump 55, a vacuum pump 56, an oxygen gas supplying system 57, a nitrogen gas supplying system 58, valves and pipes for connecting them.

Each of the oxygen adsorbents 59 obtained in Example 1 was weighed 5 g or 10 g and filled in the adsorbing tube 52. The oxygen adsorbent 59 was heated using the electric oven at 300° C. for 15 minutes while deaerating the inside of the device 51 with the vacuum pump 56. Then, the oxygen adsorbent 59 was cooled to 0° C. with the ice trap, an oxygen gas at a predetermined pressure was introduced from the oxygen gas supplying system 57 and maintained until oxygen adsorption of the oxygen adsorbent 59 reached equilibrium. The amount of adsorbed oxygen was then determined.

Further, the surface area of the oxygen adsorbent obtained in Example 1 was determined by nitrogen adsorption at a liquid nitrogen temperature (−198° C.) (a BET method) after the heating process.

Figure 9:
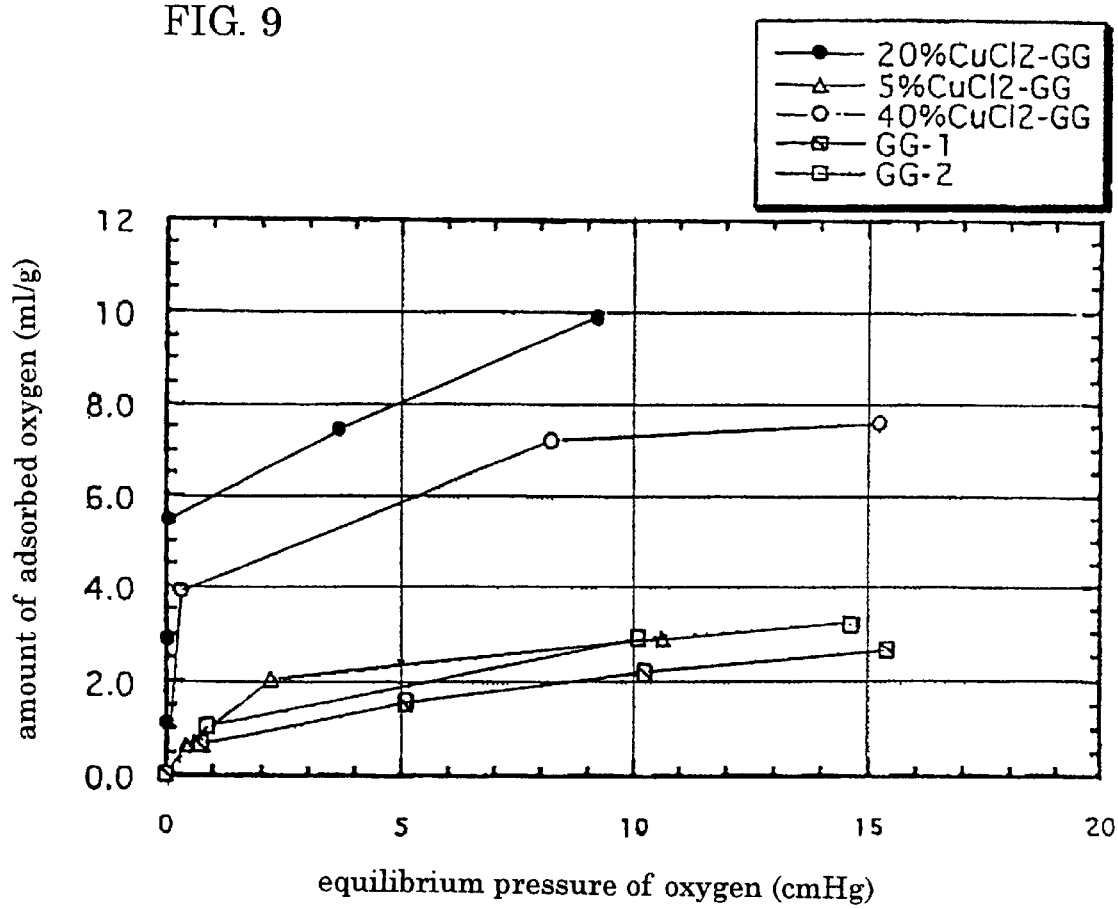
FIG. 9 is a graph showing a relationship between equilibrium pressure of oxygen and the amount of adsorbed oxygen in Example 2.

The results are shown in Table 1 and FIG. 9.

Reference Example 2

The amount of adsorbed oxygen and the surface area after heating of the 20%$CuSO_4$-GG and the 20% $FeCl_2$-GG obtained in Reference Example 1 were determined in the same manner as in Example 2.

The results are shown in Table 1.

TABLE 1

| Oxygen adsorbent | Equilibrium pressure cmHg | Amount of adsorbed oxygen ml/g | Surface area ml/g |
|---|---|---|---|
| Activated carbon (non-treated) | 15.4<br>14.65 | 2.67<br>3.23 | 896 |
| 5% $CuCl_2$-GG | 10.63 | 2.94 | 483 |
| 10% $CuCl_2$-GG | 18.70 | 6.05 | 317 |
| 20% $CuCl_2$-GG | 9.20 | 9.93 | 205 |
| 40% $CuCl_2$-GG | 15.22 | 7.60 | 13 |
| 30% $CuF_2$-GG | 18.46<br>16.59 | 8.72<br>9.94 | 24 |
| 30% CuCl-GG | 15.18 | 6.21 | 235 |
| 20% $CuSO_4$-GG | 21.56 | 3.46 | 774 |
| 20% $FeCl_2$-GG | 15.90 | 1.66 | 728 |

Table 1 and FIG. 9 show that the oxygen adsorbent used in the present invention has an enhanced oxygen adsorptivity as compared with the activated carbon itself (non-treated).

EXAMPLE 3

Determination of Amount of Adsorbed Oxygen in Repeated Regenerations

Using the 20% $CuCl_2$-GG obtained in Example 1, oxygen adsorption and regeneration by heating were repeated 5 times. The amount of adsorbed oxygen after each regeneration was determined with the closed-circulation system shown in FIG. 8 in the same manner as in Example 2.

The results are shown in Table 2.

From Table 2, it is understood that the oxygen adsorbent of the present invention restored its oxygen adsorbing ability almost completely through heating after oxygen adsorption.

TABLE 2

| Number of times | Equilibrium pressure cmHg | Amount of adsorbed oxygen ml/g |
|---|---|---|
| 1 | 17.3 | 9.24 |
| 2 | 13.6 | 8.54 |
| 3 | 16.6 | 9.39 |
| 4 | 14.4 | 8.36 |

EXAMPLE 4

Determination of Selectivity to Oxygen/nitrogen Adsorption of Oxygen Adsorbent

The 20% $CuCl_2$-GG obtained in Example 1 was heated in the closed-circulation system of FIG. 8 in the same manner as in Example 2. Then, the oxygen adsorbent 59 was cooled to 0° C., an oxygen gas or a nitrogen gas was introduced from the oxygen gas supplying system 57 or the nitrogen gas supplying system 58 and maintained until the adsorption of gas of the oxygen adsorbent 59 reached equilibrium. The amount of adsorbed gas was then determined. A selection ratio of oxygen/nitrogen adsorption was obtained from the obtained gas amount. Further, the determination was conducted in the same manner using a non-treated activated carbon instead of the 20% $CuCl_2$-GG to obtain the selection ratio of oxygen/nitrogen adsorption.

The obtained selection ratio of oxygen/nitrogen adsorption was 2.9 for the 20% $CuCl_2$-GG while it was 1.1 for the non-treated activated carbon, showing that the oxygen adsorbent of the present invention is more excellent in selectivity of oxygen/nitrogen adsorption.

As described above, the oxygen adsorbent comprises activated carbon carrying a copper halide. Therefore, it is possible to provide an oxygen adsorbent as a deoxidizing agent having an enhanced oxygen adsorptivity and an improved selectivity in oxygen adsorption and being capable of being regenerated.

Further, such oxygen adsorbents are economical because their oxygen adsorptivity can be regenerated only through heating after oxygen has been adsorbed.

EXAMPLE 5

Production of Zeolites Carrying Metallic Ion

Various kinds of zeolites (all produced by Tosoh) were immersed in aqueous solutions of nitrate of various kinds of metals for ion exchange and sintered at 500° C. to obtain zeolites carrying a metallic ion described in Table 3.

EXAMPLE 6

Determination of Oxygen Amount Adsorbed in Zeolites Carrying Metallic Ion

The oxygen amount adsorbed in each of the zeolites carrying a metallic ion obtained in Example 5 was determined with the same device as the closed-circulation system 51 of FIG. 8 provided with the adsorbing tube 52 comprised of the temperature control mechanism 53 comprising the ice trap and the electric oven, the mercury manometer 54, the circulation pump 55, the vacuum pump 56, the oxygen gas supplying system 57, the nitrogen gas supplying system 58, valves and pipes for connecting them.

Each of the zeolites carrying a metallic ion obtained in Example 5 weighed 5 g or 10 g and filled in the adsorbing tube 52. The zeolite carrying a metallic ion was heated at 300° C. for 15 minutes with the electric oven while deaerating the inside of the device 51 with the vacuum pump 56. Then, the zeolite 59 carrying a metallic ion was cooled to 0° C. with the ice trap, an oxygen gas at a predetermined pressure was introduced from the oxygen gas supplying system 57 and maintained until the oxygen adsorption of the zeolite 59 carrying a metallic ion reached equilibrium. The amount of adsorbed oxygen was then determined.

Figure 10:
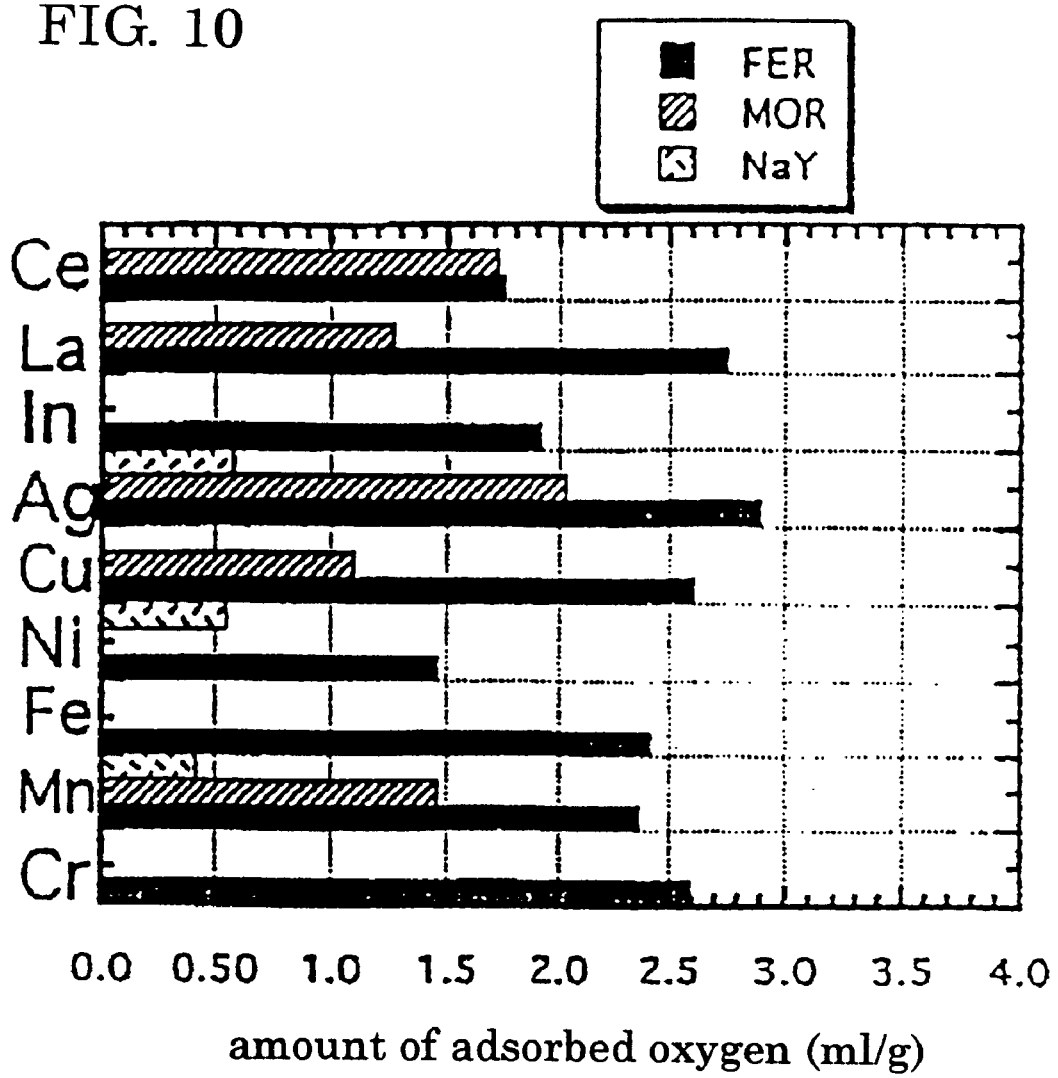
FIG. 10 is a graph showing the amount of oxygen adsorbed by zeolite carrying metallic ions in Example 6.

The results are shown in Table 3 and FIG. 10.

TABLE 3

| Catalysts | Equilibrium pressure/cmHg | Amount of adsorbed oxygen/mlg |
|---|---|---|
| Cu-FER | 13.57 | 2.61 |
| Ce-FER | 15.71 | 1.75 |
| La-FER | 13.26 | 2.76 |

TABLE 3-continued

| Catalysts | Equilibrium pressure/cmHg | Amount of adsorbed oxygen/mlg |
|---|---|---|
| Mn-FER | 16.81 | 2.37 |
| Ag-FER | 16.26 | 2.90 |
|  | 28.26 | 4.76 |
| Fe-FER | 15.80 | 1.89 |
|  | 14.42 | 2.42 |
| In-FER | 15.34 | 1.92 |
| Ni-FER | 11.88 | 1.46 |
| Cr-FER | 13.84 | 2.6 |
| FER | 16.04 | 2.49 |
| Cu-MOR | 15.68 | 1.10 |
| La-MOR | 13.97 | 1.27 |
| Ce-MOR | 15.84 | 1.72 |
| Mn-MOR | 13.69 | 1.46 |
| Ag-MOR | 12.01 | 2.03 |
| CuCl$_2$-MOR(dip) | 13.65 | 0.70 |
| Ni-NaY | 15.90 | 0.55 |
| Ag-NaY | 13.62 | 0.58 |
| Mn-NaY | 14.44 | 0.41 |
| Pt-ZSM-5 | 16.66 | 1.64 |
| Cu-ZSM-5(b) | 14.10 | 1.20 |
| Cu-ASM-5(a) | 15.41 | 1.56 |

EXAMPLE 7

Production of Composition

A granular composition (2–5 mm diameter) was obtained by mixing a zeolite itself or a zeolite carrying a metallic ion obtained in Example 5 with a compound of copper-manganese (N140) as a microwave absorbent inorganic substance and pressing-forming the resulting mixture.

EXAMPLE 8

Figure 11:
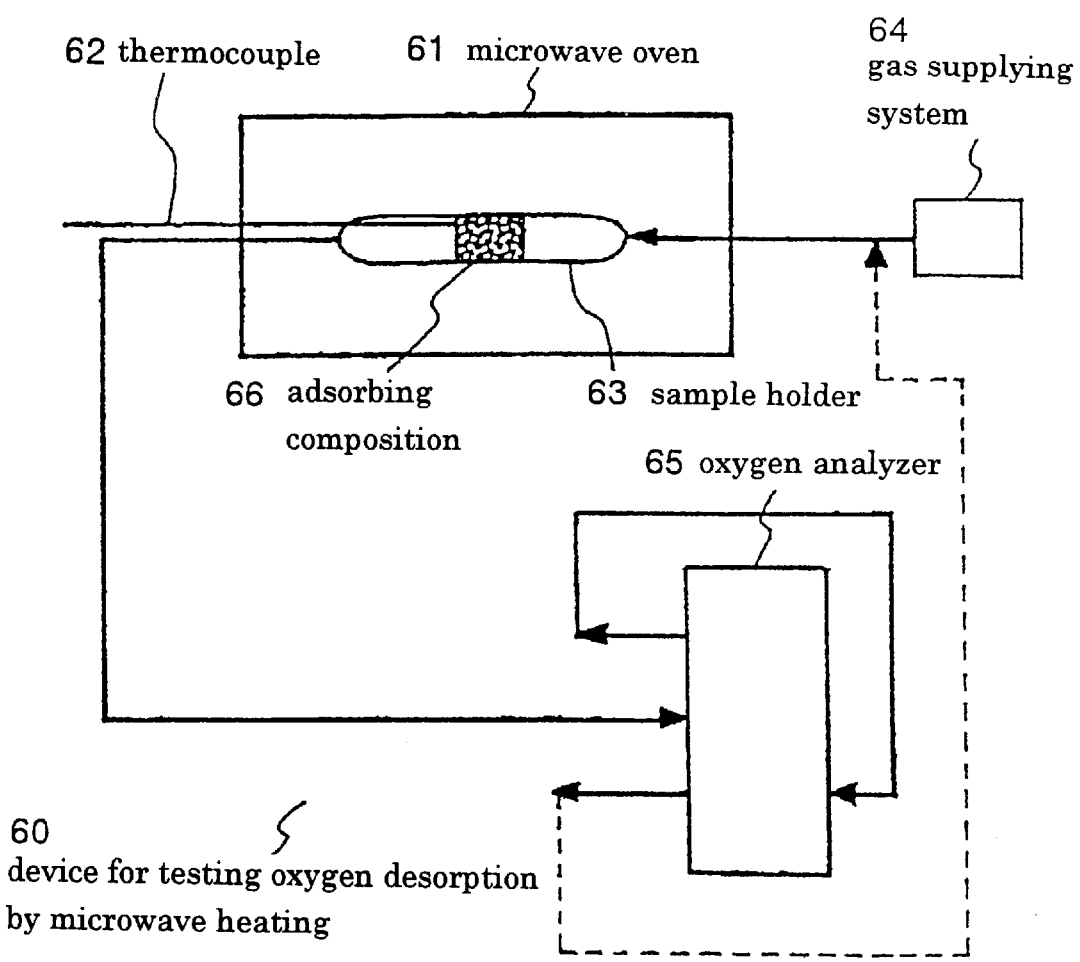
FIG. 11 is a schematic view of a device for testing oxygen desorption by microwave heating used for testing oxygen desorption of a composition with a microwave in Example 8.

Test of Oxygen Desorption of Adsorbing Composition Through Microwave Irradiation The amount of oxygen desorbed from an adsorbing composition 66 was determined using a device 60 for testing oxygen desorption with microwave heating shown in FIG. 11 comprising a sample holder 63 provided with a microwave oven 61 (a frequency of 2.45 GHz, 500 W) and a thermocouple 62, a gas supplying system 64 for supplying air or nitrogen, a circulation pump, an oxygen analyzer 65 (SCP-X; produced by NGK INSULATORS, LTD.) using a zirconia cell as a detector and pipes for connecting them.

The adsorbing composition obtained in Example 7, Ag-FER/N140 (5/1 by weight), was weighed 9.79 g and filled in the sample holder 63, and air was passed through at 300 ml/minute from the gas supplying system 64. Then, a microwave was irradiated regarding 1 second ON and 10 second OFF as 1 pulse. The temperatures at every pulse and the amounts of emitted oxygen determined by the thermocouple 62 and the oxygen analyzer 65, respectively, were shown in Table 4. Incidentally, the temperatures at every pulse in Table 4 shown in the upper side indicate temperatures before microwave irradiation, and those in the lower side indicate temperatures after microwave irradiation.

The temperatures and the amounts of emitted oxygen were determined in the same manner as described above, while circulating air or passing nitrogen through instead of passing air through. Incidentally, in the case of circulating air, the device was connected as indicated by a dotted line shown in FIG. 11. The results are shown in Table 4.

TABLE 4

| Number of pulses | Air passed through | | Air circulated | | Nitrogen passed through | |
|---|---|---|---|---|---|---|
|  | Temperature (° C.) | Amount of emitted oxygen (ml) | Temperature (° C.) | Amount of emitted oxygen (ml) | Temperature (° C.) | Amount of emitted oxygen (ml) |
| 1 | 84 |  | 78 |  | 87 |  |
|  | 242 | 1.71 | 212 | 1.71 | 225 | 1.60 |
| 2 | 132 |  | 119 |  | 113 |  |
|  | 275 | 1.38 | 303 | 2.74 | 245 | 0.68 |
| 3 | 157 |  | 169 |  | 199 |  |
|  | 284 | 1.71 | 326 | 3.75 | 312 | 0.54 |
| 4 | 172 |  | 183 |  | 174 |  |
|  | 280 | 2.40 | 329 | 3.75 | 313 | 0.30 |
| 5 | 171 |  | 190 |  | 223 |  |
|  | 306 | 1.71 | 341 | 1.71 | 334 | 0.25 |
| 6 | 182 |  |  |  |  |  |
|  | 307 | 3.75 |  |  |  |  |

From Table 4, it is found that the adsorbing composition does not deteriorate its ability even though adsorption-desorption of oxygen is repeated. Therefore, it is shown that high-concentration oxygen can be repeatedly supplied by heating the adsorbing composition through irradiation of a microwave.

As described above, the method of supplying high-concentration oxygen is characterized in that an adsorbing composition containing zeolite having adsorbed oxygen and a microwave absorbent inorganic substance is irradiated with a microwave to emit high-concentration oxygen. Accordingly, high-concentration oxygen can be supplied instantly when it is required. Further, oxygen is quickly adsorbed after oxygen has been desorbed (the adsorption-desorption cycle is short), therefore high-concentration oxygen can be repeatedly supplied in a short period.

What is claimed is:

1. An adsorbing device comprising:
    a main body having an intake port and an exhaust port and accommodating therein an adsorbing composition capable of adsorbing a gaseous specific substance;
    regenerating means attached to the main body for releasing the specific substance from the adsorbing composition;
    a sensor capable of detecting the specific substance arranged at least near the exhaust port of the main body; and
    a control unit for instructing the regenerating means to operate when the sensor detects the specific substance at a higher value than a predetermined value,
    the sensor comprising a first sensor arranged near the exhaust port and a second sensor arranged near the intake port,
    the regenerating means being a magnetron capable of emitting a microwave which heats the adsorbing composition, and
    the control unit instructing the magnetron to operate on the basis of the relative difference between a value detected by the first sensor and a value detected by the second sensor.

2. The adsorbing device according to claim 1, wherein the control unit is provided with a timer for regulating a maximum successive operation time of the regenerating means.

3. The adsorbing device according to claim 1, wherein the sensor is a semiconductor sensor in which a pair of platinum alloy wire coils is installed inside of a sinter of an n-type semiconductor comprised of a metal oxide which has been subjected to a sintering aging treatment.

4. The adsorbing device according to claim 1, wherein the adsorbing composition is in a granular shape, and the device is further provided with a container for accommodating the adsorbing composition and stirring means for stirring the adsorbing composition by rotating or oscillating the container or a part thereof.

5. The adsorbing device according to claim 1, wherein the adsorbing composition is in a granular shape, and the device is further provided with a container for accommodating the adsorbing composition, a stirring screw capable of stirring the adsorbing composition by rotation, the stirring screw being attached to the container, and drive means for the stirring screw.

6. The adsorbing device according to claim 5, wherein the stirring screw is made of a metal which reflects a microwave.

7. The adsorbing device according to claim 1, wherein the specific substance is oxygen, the adsorbing composition comprises zeolite and a microwave absorbent inorganic substance.

8. The adsorbing device according to claim 7, wherein the zeolite is ferrierite, mordenite, faujasite or ZSM-5 and the microwave absorbent inorganic substance is an oxide of manganese, nickel, iron or silicon carbide.

9. The adsorbing device according to claim 1, wherein the specific substance is oxygen, and the adsorbing composition comprises an activated carbon allowed to carry a halogenated copper.

10. The adsorbing device according to claim 9, wherein the halogen is chlorine or fluorine.

11. The adsorbing device according to claim 9 or 10, wherein the copper is bivalent copper.

12. The adsorbing device according to claim 1, wherein the specific substance is an odor, and the adsorbing composition comprises any one of a zeolite, a metal oxide and a carbon substance.

13. The adsorbing device according to claim 1, wherein the main body is provided with a fan for inhaling an exterior gas from the intake port and emitting the gas out of the exhaust port through the adsorbing composition.

14. The adsorbing device according to claim 13, wherein the main body is provided with a filter at the intake port, the filter and the fan being constituted detachably.

* * * * *